(12) United States Patent
Anders

(10) Patent No.: US 10,489,251 B2
(45) Date of Patent: Nov. 26, 2019

(54) NETWORK BACKUP

(71) Applicant: HEWLETT PACKARD ENTERPRISE DEVELOPMENT LP, Houston, TX (US)

(72) Inventor: Valentin Anders, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 199 days.

(21) Appl. No.: 15/500,915

(22) PCT Filed: Nov. 18, 2014

(86) PCT No.: PCT/US2014/066128
§ 371 (c)(1),
(2) Date: Jan. 31, 2017

(87) PCT Pub. No.: WO2016/080963
PCT Pub. Date: May 26, 2016

(65) Prior Publication Data
US 2017/0220425 A1    Aug. 3, 2017

(51) Int. Cl.
*H04L 29/06* (2006.01)
*G06F 11/14* (2006.01)
(Continued)

(52) U.S. Cl.
CPC ...... *G06F 11/1464* (2013.01); *G06F 11/1456* (2013.01); *G06F 11/1469* (2013.01); *G06F 21/6218* (2013.01); *H04L 12/28* (2013.01); *H04L 12/6418* (2013.01); *H04L 63/08* (2013.01); *H04L 63/102* (2013.01); *H04L 63/18* (2013.01); *H04L 67/1095* (2013.01);
(Continued)

(58) Field of Classification Search
CPC ............ G06F 11/1464; G06F 11/1456; G06F 11/1469; G06F 21/6218; G06F 2201/84; H04L 12/28; H04L 12/6418; H04L 63/08; H04L 63/102; H04L 63/18; H04L 67/1095; H04L 67/1097; H04L 67/2842
See application file for complete search history.

(56) References Cited

U.S. PATENT DOCUMENTS 7,330,997 B1 * 2/2008 Odom ................. G06F 11/1464
711/162
7,447,850 B1   11/2008 Del Rosso et al.
(Continued)

FOREIGN PATENT DOCUMENTS

KR    1020050041898 A    5/2005

OTHER PUBLICATIONS

Cathy J. Fitzpatrick, "Some Thoughts on Making Backups," Sep. 7, 2013, pp. 1-3, Available at: <cathyjf.com/articles/some-thoughts-on-making-backups>.
(Continued)

*Primary Examiner* — Sarah Su
(74) *Attorney, Agent, or Firm* — Hewlett Packard Enterprise Patent Department

(57) ABSTRACT

Implementations may obtain a backup from a first storage system accessible outside a local area network (LAN). The backup may be stored on a second storage system inaccessible outside the LAN. An authorized backup user may be authenticated and the backup may be copied from the to a third storage system accessible outside the LAN.

15 Claims, 5 Drawing Sheets

(51) Int. Cl.
  *H04L 12/28*    (2006.01)
  *H04L 12/64*    (2006.01)
  *G06F 21/62*    (2013.01)
  *H04L 29/08*    (2006.01)
(52) U.S. Cl.
  CPC ...... *H04L 67/1097* (2013.01); *H04L 67/2842* (2013.01); *G06F 2201/84* (2013.01)

(56) References Cited

U.S. PATENT DOCUMENTS

| | | | | |
|---|---|---|---|---|
| 7,792,789 | B2* | 9/2010 | Prahlad | G06F 21/6227 707/608 |
| 8,195,153 | B1* | 6/2012 | Frencel | G06F 11/1456 340/995.24 |
| 8,689,294 | B1 | 4/2014 | Thakur et al. | |
| 2003/0018657 | A1 | 1/2003 | Monday | |
| 2005/0010733 | A1* | 1/2005 | Mimatsu | G06F 11/1458 711/162 |
| 2005/0052548 | A1* | 3/2005 | Delaney | H04N 5/765 348/231.2 |
| 2006/0230264 | A1 | 10/2006 | Catherman | |
| 2006/0230439 | A1 | 10/2006 | Smith et al. | |
| 2007/0069030 | A1* | 3/2007 | Sauerwein, Jr. | G06K 7/0004 235/462.46 |
| 2007/0186106 | A1 | 8/2007 | Ting et al. | |
| 2008/0154989 | A1* | 6/2008 | Arman | G06F 11/1456 |
| 2008/0244732 | A1* | 10/2008 | Coninck | G06F 11/1469 726/17 |
| 2009/0150510 | A1* | 6/2009 | Kovacs | G06F 11/1464 709/213 |
| 2011/0082991 | A1* | 4/2011 | Leman | G06F 11/1456 711/162 |
| 2011/0289561 | A1* | 11/2011 | Ivanov | G06F 11/1464 726/4 |
| 2013/0191341 | A1* | 7/2013 | Alexander | G06F 11/1464 707/640 |
| 2014/0101212 | A1* | 4/2014 | Maze | H04L 63/10 707/827 |
| 2015/0067036 | A1* | 3/2015 | Nambiar | H04L 67/306 709/203 |
| 2016/0132684 | A1* | 5/2016 | Barbas | G06F 21/602 713/165 |
| 2017/0206034 | A1* | 7/2017 | Fetik | G06F 3/0653 |

OTHER PUBLICATIONS

International Search Report and Written Opinion, International Application No. PCT/US2014/066128, dated Aug. 13, 2015, pp. 1-10, KIPO.

Niko Vrdoljak, "Backup Your Windows Phone Isolated Storage Data to Skydrive Using Live Connect API," Blog, Sep. 15, 2011, pp. 1-18, Available at: <nikovrdoljak.wordpress.com/2011/09/15/backup-your-windows-phone-isolated-storage-data-to-skydrive-using-live-connect-api/>.

Roger Meyer, "Secure Authentication on the Internet," Apr. 4, 2007, pp. 1-34, SANS Institute.

* cited by examiner

NETWORK BACKUP

BACKGROUND

A remote backup service is a service that provides a system for backup, storage, and recover of computer files. A cloud backup service provides a remote backup service through a cloud infrastructure. Some cloud backup services allow automated recovery as well as automated backup.

BRIEF DESCRIPTION OF THE DRAWINGS

Certain examples are described in the following detailed description and in reference to the drawings, in which.

DETAILED DESCRIPTION OF SPECIFIC EXAMPLES

Many cloud services providing data storage, backup, archiving, and disaster recovery are automated and provide control panel interfaces to allow users to manage their services. Many of these service depend on credentials such as security keys for security and authentication. If these credentials are compromised, an unauthorized party may gain access to the cloud services control panel and may compromise or destroy the user's data as well as their backups or archives.

Aspects of the disclosed technology provide temporal isolation of data storage backups associated with a remote backup service. A backup copy of data may be kept on an offline storage system that is inaccessible outside a firewall and that cannot be managed using a cloud services control panel. Recovery of the data from the offline storage may require authentication and approval over a hardened security channel, which may include manual verification of credentials. During the recovery process, a copy of the backup may be transferred from the offline storage to a storage that is accessible from outside the firewall. The copy of the backup may then be transferred to the system using the backup for recovery.

Figure 1:
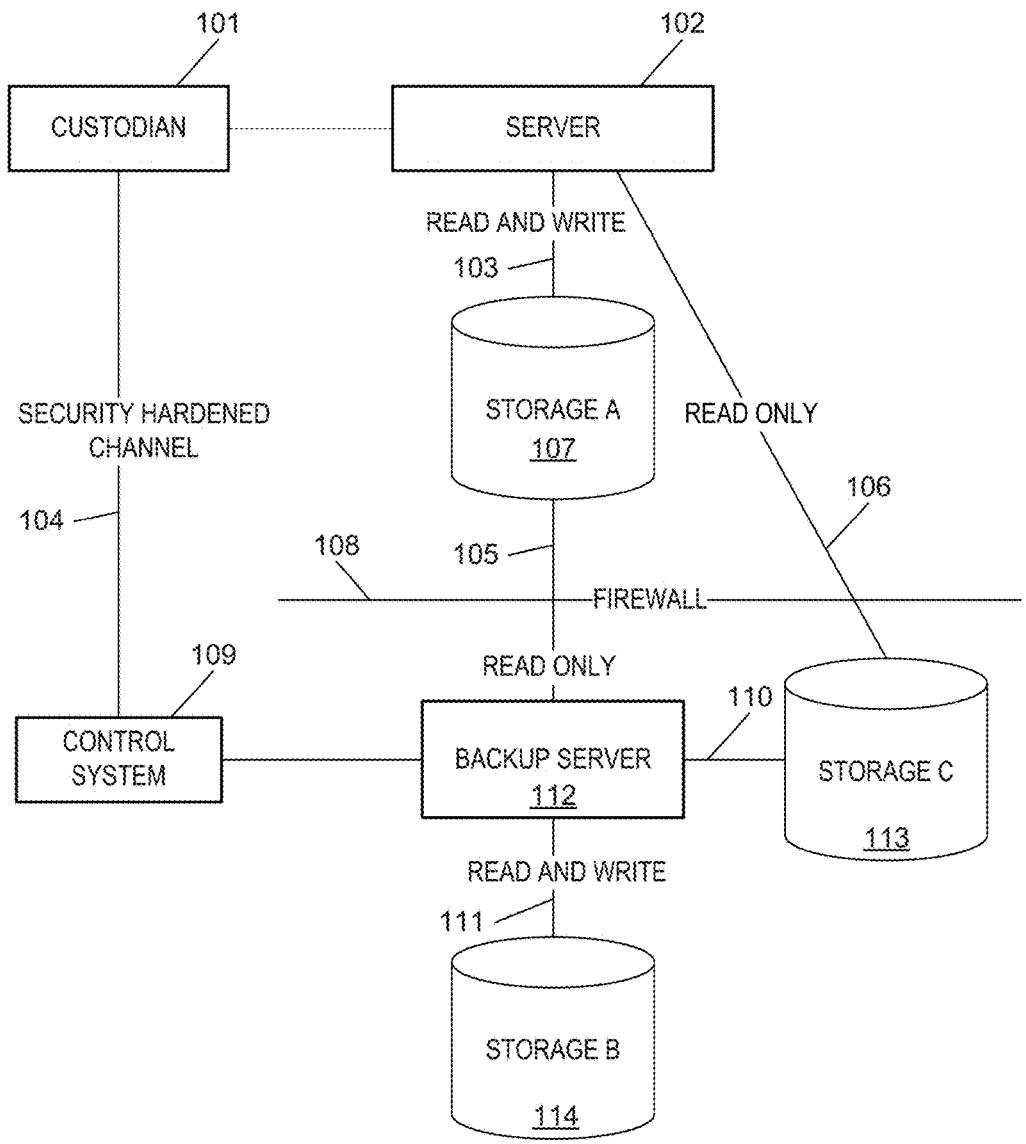
FIG. 1 illustrates an example implementation of a backup system providing temporally isolated backups.

FIG. 1 illustrates an example implementation of a backup system providing temporally isolated backups. The implementation includes a first server 102 connected to a first storage system 107. For example, the first server 102 may be a server hosting a client application. In another example, the first server 102 may be a server hosting a backup application providing backups to a connected client application. In some implementations, the server 102 may be a physical or virtual machine located at a customer premises, a shared premises, or a private, public, or virtual private cloud infrastructure.

The first storage system 107 may comprise any storage medium. For example, the storage system 107 may be a disk based storage, flash based storage, or other type of storage. In some implementations, the first storage system 107 may be collocated with the server 102. For example, the storage system 107 may a storage volume of the server 102. In other implementations, the storage system 107 may be connected to the server 102 via a network connection. For example, the first storage system 107 may be a network attached storage (NAS) or may be a part of a storage area network (SAN).

In the illustrated example, the server 102 has read and write privileges to the first storage system 107. The server 102 uses the storage system 107 to store data. For example, if the server 102 executes a backup application, the data may be a backup of other application data. As another example, if the server 102 executes a client application, the data may be the application data, such as a copy of a virtual machine image.

The illustrated example further includes a backup server 112. The backup server 112 is connected 105 to the first storage system 107 with read only privileges. For example, the backup server 112 may be on a local area network (LAN) behind a firewall 108 that enforces the privileges. As another example, the first storage system 107 or other network appliance may enforce the read only privileges. The backup server 112 is configured to retrieve a backup of user data on the first storage system 107. For example, the backup server 112 may create a backup of user data stored on the storage system 107. As another example, the backup server 112 may obtain a copy of a backup stored on the first storage system 107.

In this example, the backup server 112 has read and write privileges 111 to a second storage system 114. For example, the second storage system 114 may be a NAS or volume on a SAN that is accessible on the local network by the backup server. As another example, the second storage system 114 may be a local storage volume of backup server 112. For example, backup server 112 and the second storage system 114 may be components of the same physical or virtual machine. In the illustrated implementations, the second storage system 114 is connected to the LAN and inaccessible outside the network. For example, the firewall 108 may prevent access to the second storage system 114 by devices outside the local network.

In this implementation, the backup server 112 stores the backup retrieved from the first storage system 107 on the second storage system 114. In some implementations, the backup server 112 maintains the backup on the second storage system 114 for at least a predefined quarantine period, during which the backup is not allowed to be deleted from the second storage system 114.

In the illustrated example, the backup server 112 also has read and write privileges 110 to a third storage system 113. In some implementations, the third storage system 113 may be a NAS or volume on a SAN that is accessible on the local network by the backup server. In other implementations, the third storage system 113 may a storage volume of the backup server 112. For example, in one implementation, the second storage system 114, and third storage system 113 may both be storage volumes on a system bus of the backup server 112.

The third storage system 113 is also accessible by the server 102. For example, the server 102 may be granted read only privileges 106 to the third storage system 113. In this example, if instructed by a control system 109, the backup server 112 retrieves a copy of the backup from the second storage system 114 and writes it onto the third storage system 113. The server 102 may then retrieve the backup from the third storage system 113 and restore it to the first storage system 107.

In the illustrated example, the control system 109 issues the instruction to retrieve the backup to the backup server 112 after authenticating a custodian 101 of the backup data.

For example, the custodian 101 may be a system administrator or other designated party that has authorization to request data retrieval. The authentication may occur over a security hardened channel 104. The security hardened channel may be an out-of-band communication channel different from the network connections 103, 105, 106 used to connect to the backup server 112 and third storage 113. For example, a multi-factor authentication process may be employed to verify a requesting party is authorized to request a backup restoration. For example, a requesting party may send a request for restoration, and a system administrator of the control system 109 may call the authorized party using a previously designated phone number. The system administrator may then manually authenticate the authorized party using further authentication procedures. As another example, upon request by the requesting party, a system administrator may call multiple known numbers to speak to a set of authorized security officers. The system administrator may then use the control system 109 to instruct retrieval if the entire set of authorized security offers, or a threshold number of officers, agree to the recovery.

In this implementation, even if a backup or data stored on the first storage 107 is compromised, an adversary may be prevented from compromising the copy of the backup because of the quarantine period. Additionally, the adversary may be prevented from obtaining a copy of the backup data from the second storage 114 because of the control system 109 and firewall 108.

Figure 2:
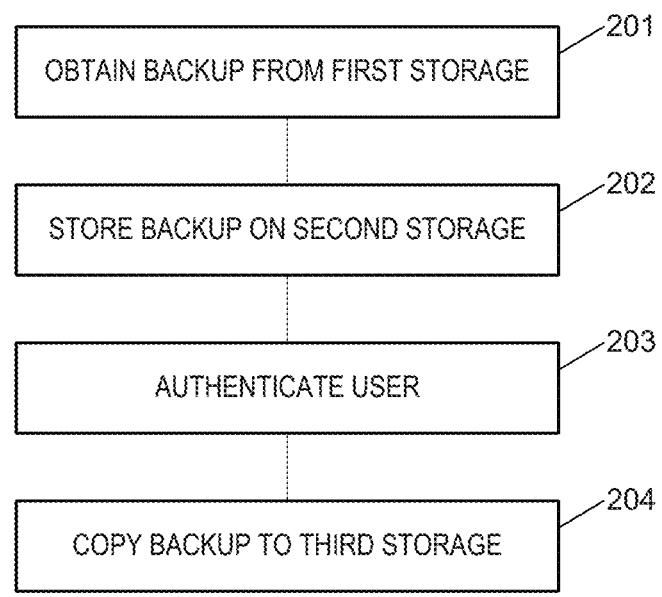
FIG. 2 illustrates an example method of operation of a backup system.

FIG. 2 illustrates an example method of operation of a backup system. For example, the method of FIG. 2 may be performed by backup server and control system, such as backup server 112 and control system 109 of FIG. 1.

The example method may include block 201. Block 201 may include obtaining a backup from a first storage system. The first storage system may be accessible outside a local area network (LAN). For example, the first storage system may be located outside a firewall. As an example, the first storage system may be located at a customer's premises or on a public or private cloud infrastructure. In some implementations, the first storage system may be a storage as described with respect to storage 107 of FIG. 1. For example, block 201 may include copying an existing backup from the first storage. As another example, block 201 may include generating a backup of other data stored on the first storage system. In various implementations, block 201 may be performed at scheduled times or upon command.

In some implementations, the first storage system may be read-only accessible by a backup system obtaining the backup from the first storage system. For example, a firewall, such as firewall 108 of FIG. 1, may enforce read-only privileges for the backup system to access the first storage system.

The example method may also include block 202. Block 202 may include storing the backup on a second storage system. The second storage system may be inaccessible outside the LAN. For example, second storage system may as described with respect to storage system 114 of FIG. 1. In some implementations, block 202 may include maintain the backup in the second storage system for at least a quarantine period. For example, the backup system may refuse to execute any command to delete the backup within the quarantine period.

The example method may include block 203. Block 203 may include authenticating an authorized backup user. In some implementations, the authorized backup user may be authenticated using a channel other than a network connection to the LAN. For example, the authorized backup user may be a data custodian 101 and the channel may be a security hardened channel 104 as described with respect to FIG. 1.

The example method may also include block 204. Block 204 may include copying the backup from the second storage system to a third storage system. The third storage system may be accessible outside the LAN. For example, the third storage system may be a storage system as described with respect to storage system 113 of FIG. 1. In some implementations, the backup on the third storage system is accessible with read only privileges to the authorized backup user.

Figure 3:
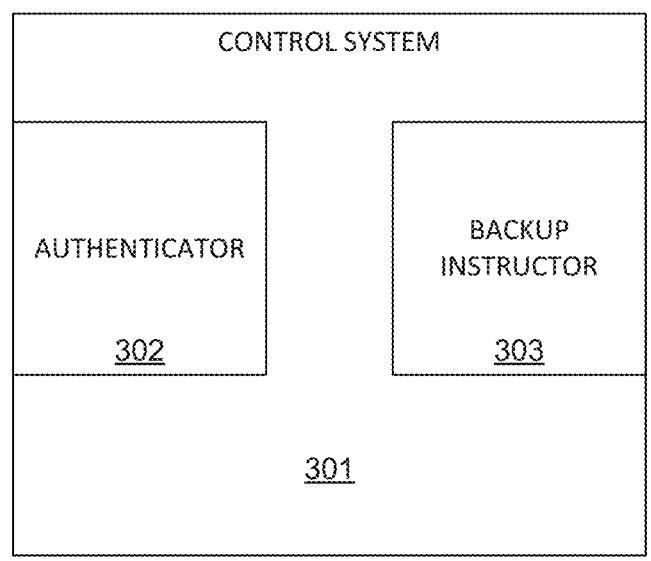
FIG. 3 illustrates an example system including an authenticator and a backup instructor.

FIG. 3 illustrates an example system 301 including an authenticator 302 and a backup instructor 303. For example, the example system 301 may be an implementation of a control system 109 as described with respect to FIG. 1. In various implementations, the illustrated modules 302, 303 may be implemented as software modules stored on a non-transitory computer readable medium and executed by a processor, as hardware modules, or a combination thereof.

The example control system 301 may include an authenticator 302. The authenticator 302 may obtain verification of an identification of a user authorized for backup recovery over an out-of-band channel. For example, the control system 301 may provide a user interface to allow a system administrator to provide the identification verification. Additionally, the authenticator 302 may provide authentication information used by the system administrator to authenticate the authorized user. In another example, the authenticator 302 may obtain verification of the identification by performing an automatic authentication procedure. For example, the authenticator 302 may perform multi-factor authentication using one or more communication channels. For example, the authenticator 302 may send a text message containing an authorization code to a previously designated telephone number. The authenticator 302 may then present an interface, such as a web form, on a network channel to allow the authorized user to enter the authorization code.

The example control system 301 may also include a backup instructor 303. Upon authorizing the user for backup recovery, the control system 301 may use the instructor 303 to instruct a backup system to allow recovery of a backup. The instruction may be to copy the backup from a first storage system inaccessible outside a local area network (LAN) to a second storage system accessible outside the local area network. For example, the backup system may be a backup server 112, the first storage system may be a storage system 114, and the second storage system may be a storage system 113 as described with respect to FIG. 1.

Figure 4:
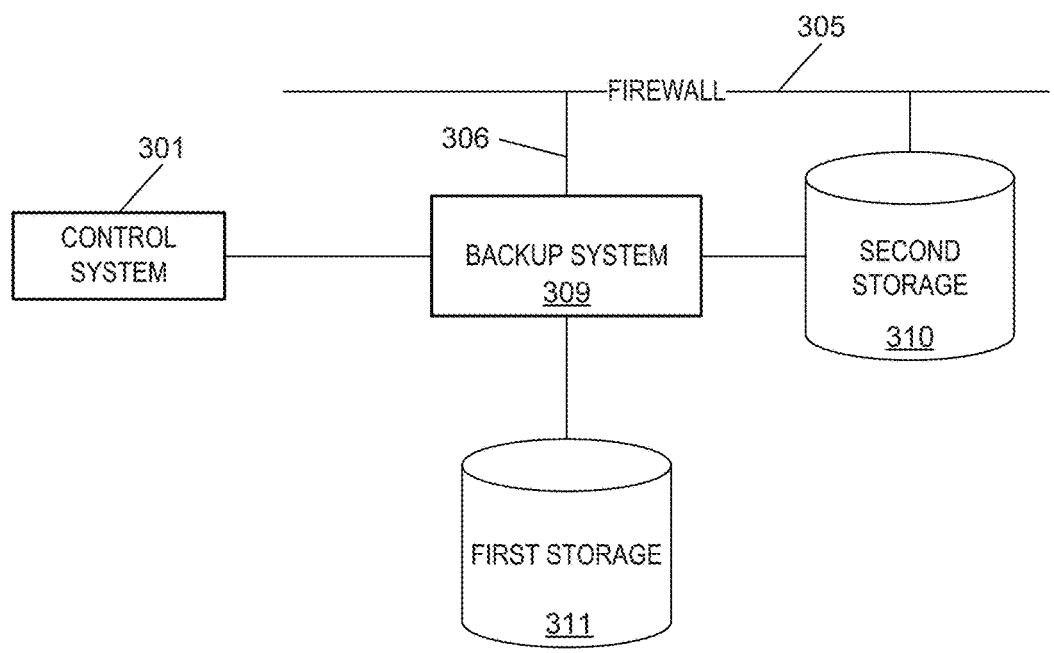
FIG. 4 illustrates an example system including a control system, backup system, two storage systems, and firewall.

FIG. 4 illustrates an example system including a control system 301, backup system 309, two storage systems 310, 311, and firewall 305.

In the illustrated implementation, the system includes a backup system 309. The backup system 309 may be connected to the backup instructor 303 of the control system 301. For example, the backup system 309 may be a backup server 112 as described with respect to FIG. 1.

The system of FIG. 4 may further include the first storage system 311 connected to the backup system 309 over the LAN 306. The first storage system 311 may inaccessible outside the LAN 306 and may be used by the backup system 309 to store the backup. For example, the first storage system 311 may be a storage as described with respect to storage system 114 of FIG. 1.

The system of FIG. 4 may further include a firewall 305. The firewall 305 may be connected to the LAN 306 and may prevent access to the first storage system 311 from outside the LAN 306. Additionally, the firewall 305 may allow read-only access to the second storage system 310 to the authorized user.

Figure 5:
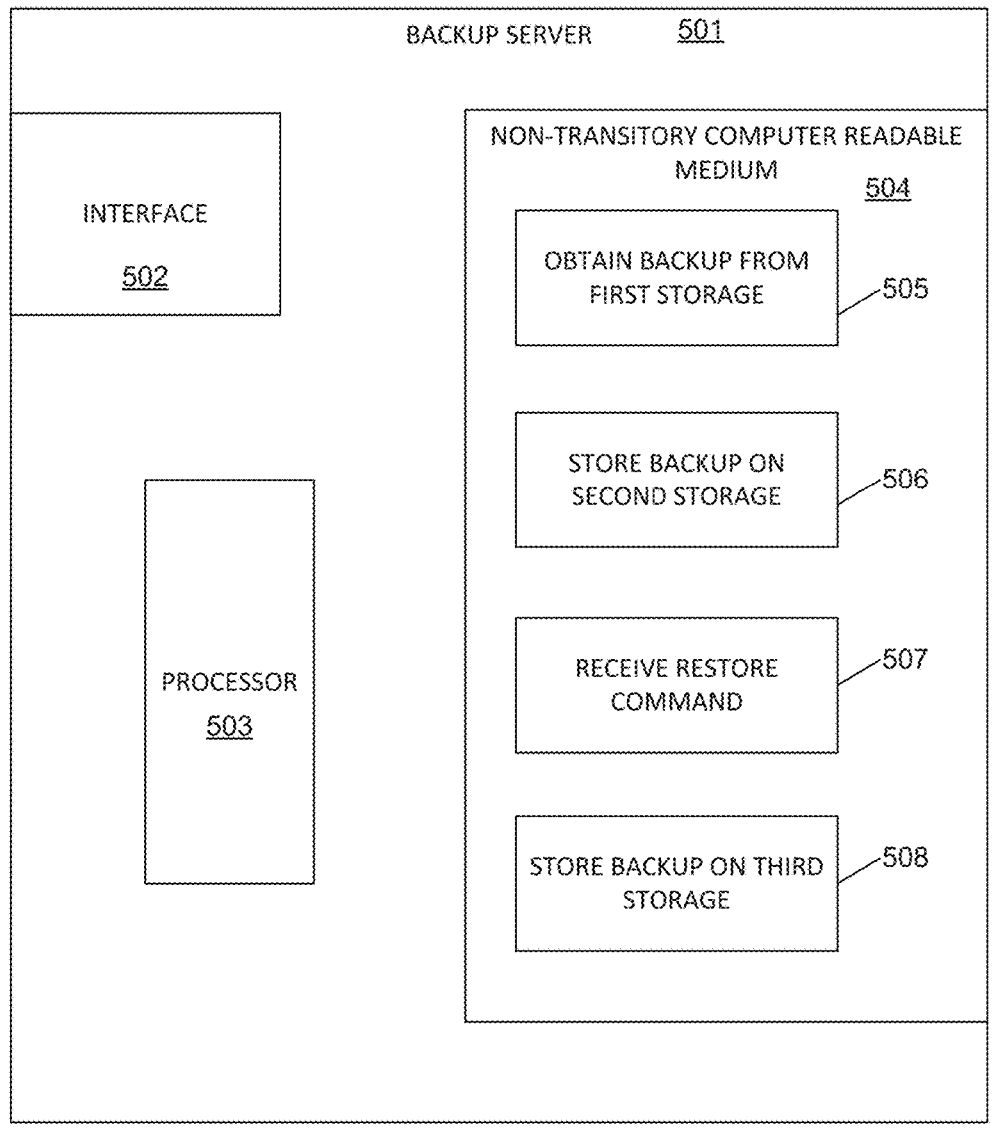
FIG. 5 illustrates a backup server including a non-transitory computer readable medium storing backup instructions.

FIG. 5 illustrates a backup server 501 including a non-transitory computer readable medium 504 storing backup instructions 505-508. For example, the backup server 501 may be an implementation of a backup server 112 as described with respect to FIG. 1. In various implementations, the non-transitory computer readable medium 504 may include memory, such as random access memory or flash memory, storage, or a combination thereof.

The non-transitory computer readable medium 504 may store a first set of instructions 505. The instructions 505 may be executable by a processor 503 to obtain a backup of data from a first storage system via a network interface 502. In this implementation, the first storage system is accessible outside a local network. For example, the first storage system may be a storage 107 as described with respect to FIG. 1. In some cases, the first storage system may be read-only accessible by the backup system 501. In some implementations, the instructions 505 may be further executable to generate the backup by backing up data stored on the first storage system. In other implementations, the instructions 505 may be further executable to obtain the backup of data from the first storage system by copying an existing backup.

The medium 505 may store a second set of instructions 506. The instructions 506 may be executable by the processor 503 to store the backup on a second storage system, the second storage system inaccessible outside the local network. For example, the processor 503 may execute the instructions 506 to use the interface 502 to store the backup on a storage system such as storage system 114 of FIG. 1. In some cases, the instruction 506 may be further executable to maintain the backup on the second storage system for at least a quarantine period.

The medium 505 may store a third set of instructions 507. The instructions may be executable by the processor 503 to receive a restore command from an authentication system. For example, the authentication system may be a control system 109 as described with respect to FIG. 1.

The medium 505 may store a fourth set of instructions 508. the instructions 508 may be executable by the processor 503 to store the backup on a third storage system accessible outside the local network. For example, the instructions 508 may be executable to store the backup on the third system in response to receiving the restore command. In some implementations, the third system may be as described with respect to the storage 113 of FIG. 1. For example, the third system may be read-only accessible by a system outside the local network authorized to access the backup on the third storage system.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
obtaining a backup from a first storage system, wherein the first storage system is outside of a local area network (LAN), and the first storage system is accessible outside the LAN;
storing the backup on a second storage system, wherein the second storage system is part of the LAN and is inaccessible outside the LAN;
authenticating an authorized backup user in response to a request to restore the backup;
in response to the request and authentication of the user, copying the backup from the second storage system to a third storage system, wherein the third storage system is part of the LAN and is accessible outside the LAN, wherein:
the LAN is inside a firewall;
the first storage system is outside the firewall;
the second storage system has a read only privilege to the first storage system; and
the backup is stored on the first storage system by a server outside the firewall and having read and write privileges to the first storage system.

2. The method of claim 1, wherein the first storage system is read-only accessible by a backup system obtaining the backup from the first storage system.

3. The method of claim 1, further comprising:
maintaining the backup in the second storage system for at least a quarantine period.

4. The method of claim 1, further comprising:
authenticating the authorized backup user using a channel other than a network connection to the LAN.

5. The method of claim 1, further comprising:
wherein the backup on the third storage system is accessible with read only privileges to the authorized backup user.

6. A system, comprising: a processor; and
a memory to store instructions that, when executed by the processor, cause the processor to:
obtain verification of an identification of a user authorized for backup recovery over an out-of-band channel;
instruct a backup system associated with a local area network to allow recovery of a backup by copying a backup from a first storage system to a second storage system, wherein the first storage system is part of the local area network and is inaccessible outside the local area network, and the second storage system is part of the local area network and is accessible outside the local area network, wherein:
the first storage system is located inside a firewall;
the second storage system is located inside the firewall;
the backup system is located inside the firewall and has read and write privileges to the first storage system;
a server outside of the firewall has a read only privilege to the second storage system; and
the server outside of the firewall does not have access privileges to the first storage system.

7. The system of claim 6, wherein the backup system allows recovery of the backup in response to the verification of the identification of the user.

8. The system of claim 7, further comprising the first storage system connected to the backup system over the local area network.

9. The system of claim 6, further comprising:
a firewall connected to the local area network to prevent access to the first storage system from outside the local area network.

10. A non-transitory computer readable medium storing instructions executable by a processor to:
obtain a backup of data from a first storage system, wherein the first storage system is outside a local network and is accessible outside the local network;

store the backup on a second storage system, wherein the second storage system is part of the local network and is inaccessible outside the local network;

receive a restore command from an authentication system; and store the backup on a third storage system, wherein the third storage system is part of the local network and is accessible outside the local network, wherein the third storage system is located inside a firewall;

the second storage system is located inside the firewall;

the first storage system is located outside the firewall;

the instructions are executable by the processor to cause a backup server inside the firewall to store the backup on the third storage system;

the backup server has read and write privileges to the second storage system; and the backup server has a read only privilege to the first storage system.

11. The non-transitory computer readable medium of claim 10, wherein the first storage system is read-only accessible by a backup system comprising the processor and the non-transitory computer readable medium.

12. The non-transitory computer readable medium of claim 10, wherein the third storage system is read-only accessible by a system outside the local network authorized to access the backup on the third storage system.

13. The non-transitory computer readable medium of claim 10, storing further instructions to:

generate the backup of data on the first storage system.

14. The non-transitory computer readable medium of claim 10, storing further instructions to:

obtain the backup of data from the first storage system by copying an existing backup.

15. The non-transitory computer readable medium of claim 10, storing further instructions to:

maintain the backup of data on the second storage system for at least a quarantine period.

* * * * *